US011649898B2

(12) United States Patent
Tarabzouni

(10) Patent No.: US 11,649,898 B2
(45) Date of Patent: May 16, 2023

(54) VALVE STEM RETAINER DEVICE, SYSTEM, AND METHOD FOR INSTALLING THE SAME

(71) Applicant: SAUDI ARABIAN OIL COMPANY, Dhahran (SA)

(72) Inventor: Mohanned Tarabzouni, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 83 days.

(21) Appl. No.: 17/168,802

(22) Filed: Feb. 5, 2021

(65) Prior Publication Data
US 2022/0252161 A1 Aug. 11, 2022

(51) Int. Cl.
*F16K 1/48* (2006.01)
*B25B 27/24* (2006.01)

(52) U.S. Cl.
CPC .............. *F16K 1/482* (2013.01); *B25B 27/24* (2013.01)

(58) Field of Classification Search
CPC ........ F16K 1/482; F16K 43/00; F16K 31/504; F16K 35/04; F16K 35/06; F16K 35/10; F16K 3/0254; F16K 3/0263; B23P 15/001; B25B 27/24
See application file for complete search history.

(56) References Cited

U.S. PATENT DOCUMENTS

| 1,432,621 | A | * | 10/1922 | Rath | .................. F16K 35/10 |
| | | | | | 70/180 |
| 3,263,312 | A | | 8/1966 | Shafer | |
| 3,273,856 | A | | 9/1966 | Tauschek | |
| 5,323,805 | A | | 6/1994 | Scaramucci | |
| 6,453,633 | B1 | * | 9/2002 | Wilkinson, Jr. | .......... E04B 9/20 |
| | | | | | 40/631 |
| 8,887,755 | B2 | | 11/2014 | Nguyen et al. | |
| 2016/0281877 | A1 | | 9/2016 | He | |

FOREIGN PATENT DOCUMENTS

| CA | 2315125 A1 | * | 2/2002 | ........... F16K 3/0254 |
| CN | 103574088 A | | 2/2014 | |
| CN | 107448632 A | * | 12/2017 | |
| CN | 108626425 A | * | 10/2018 | ............ F16K 25/04 |
| CN | 111120669 A | * | 5/2020 | |
| KR | 20100062069 A | * | 6/2010 | |

* cited by examiner

*Primary Examiner* — Marina A Tietjen
(74) *Attorney, Agent, or Firm* — Osha Bergman Watanabe & Burton LLP

(57) ABSTRACT

A valve stem retainer device may include a housing that holds a valve stem. The housing may prevent the valve stem from closing without control. The device may include at least one bracket that holds on to the housing. The device may include a steel rod that holds on to the housing. The steel rod may support the at least one bracket. The device may include a double set of a washer and a nut that ensures a tight and secure connection between the at least one bracket and the housing.

15 Claims, 5 Drawing Sheets

VALVE STEM RETAINER DEVICE, SYSTEM, AND METHOD FOR INSTALLING THE SAME

BACKGROUND

A valve is a device configured to regulate, directs, or control a fluid flow by opening, closing, or partially obstructing various passageways. Valves are considered to be fittings configured for providing reliable isolation, precision modulation control of the fluid flow, and to withstand extreme temperatures. Valves modify the fluid flow based on a rotation of a valve stem, which directly moves a blocking element in an inner chamber of the valve.

SUMMARY

In general, in one aspect, embodiments disclosed herein relate to a valve stem retainer device. The device includes a housing that holds a valve stem. The housing prevents the valve stem from closing without control. The device includes at least one bracket that holds on to the housing. The device includes a steel rod that holds on to the housing. The steel rod supports the at least one bracket. The device includes a double set of a washer and a nut that ensures a tight and secure connection between the at least one bracket and the housing.

In general, in one aspect, embodiments disclosed herein relate to valve stem retainer system. The system includes a valve stem that extends from an inner valve chamber to an outer valve chamber. The system includes a valve stem retainer device. The device includes a housing that holds a valve stem. The housing prevents the valve stem from closing without control. The device includes at least one bracket that holds on to the housing. The device includes a steel rod that holds on to the housing. The steel rod supports the at least one bracket. The device includes a double set of a washer and a nut that ensures a tight and secure connection between the at least one bracket and the housing.

In general, in one aspect, embodiments disclosed herein relate to a method for installing a valve stem retainer device. The method includes identifying a valve system type for preventing a valve stem from falling into an inner valve chamber. The method includes holding the valve stem in place using a housing of the valve stem retainer device. The housing prevents the valve stem from closing without control. The method includes supporting at least one bracket with a steel rod holding onto the housing. The at least one bracket prevents the valve stem from falling into an inner chamber of the valve system. The method includes connecting tightly and securely the at least one bracket to the housing using a double set of a washer and a nut.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
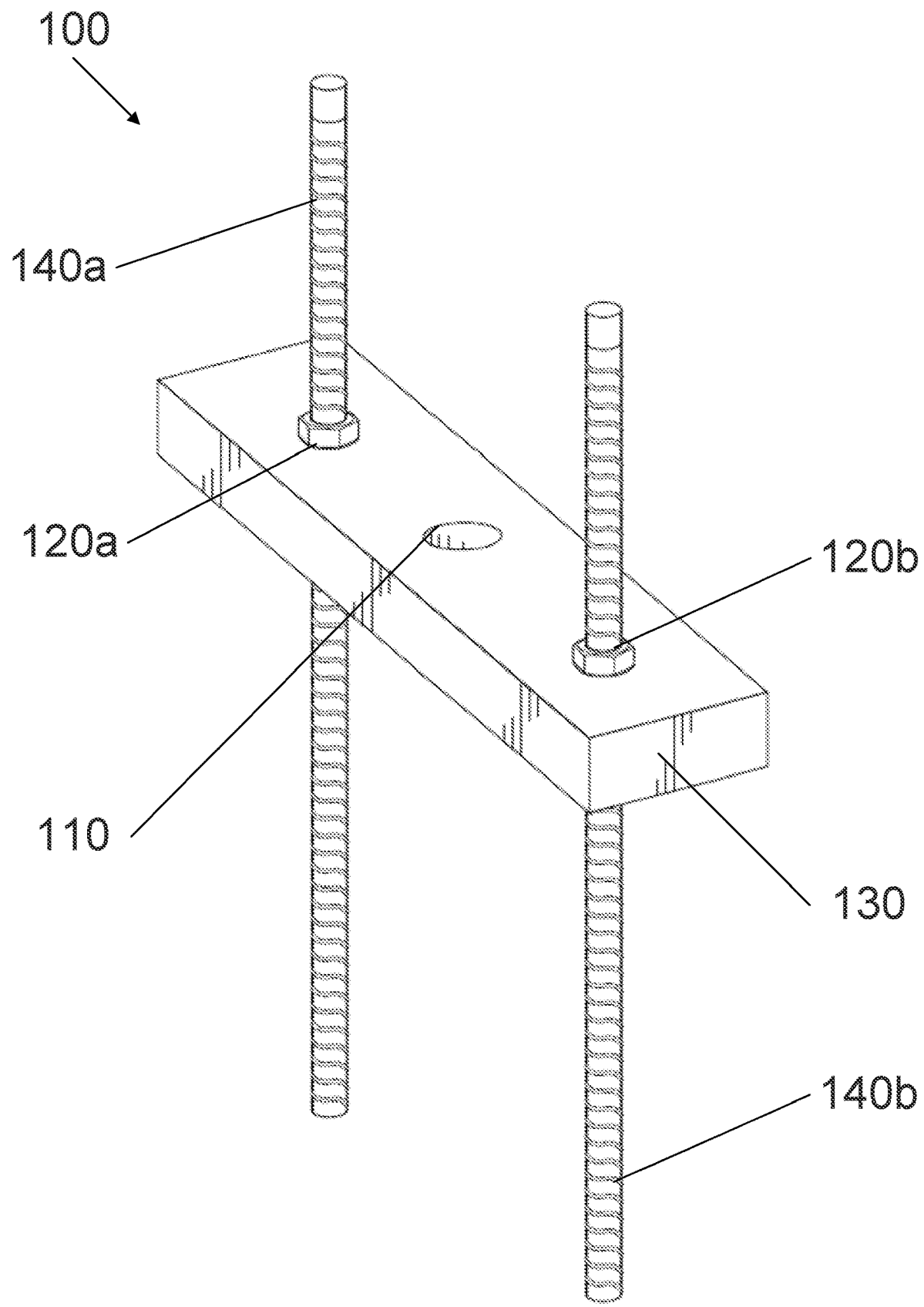
FIG. 1 shows a schematic diagram showing a valve stem retainer device in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a valve stem retainer device, a valve stem retainer system, and a method for installing the valve stem retainer device. The valve stem retainer device restrains a valve stem from moving or falling into an inner chamber of a valve. The valve stem may fall when suddenly closing a valve during in-line repair or maintenance activities. The valve stem retainer device targets linear motion valves such as gate valves, globe valves, and any type of valve with a rising stem design. Throughout the removal of a top actuator or mounted gearbox of a valve, the valve closure element namely gate may be restrained from free falling using the valve stem retainer device. Falling may damage the valve internal body and cause the valve to fully close and/or get jammed. The valve stem retainer device consists of a connection to ensure that the valve stem is held without movement to prevent it from closing the valve without control.

Advantageously, the valve stem retainer device prevents risk of flow interruption, which may suddenly increase pipeline pressure causing surges and other process safety events. The valve stem retainer device ensures safe execution of any repair job conducted on valves such as packing replacement, stem nut repair, and actuator/gearbox removal. The valve stem retainer device also prevents sudden closure of the valve in an uncontrolled manner by standardizing stem restraining systems to ensure safe and robust valve structure.

FIG. 1 shows a perspective view of a valve stem retainer device 100 in accordance to one or more embodiments. The valve stem retainer device 100 includes a housing 110 that holds a valve stem (not shown). The valve stem retainer device 100 relies on the housing 110 (e.g., a hole or an enclosure) for preventing the valve stem from closing without control. The valve stem retainer device 100 includes at least one bracket 130, a set steel rod 140a or 140b that holds onto the housing 110 through the bracket 130, and a double set 120a or 120b of a washer and a nut. The valve stem retainer device 100 ensures a tight and secure connection between the at least one bracket 130 and the housing 110.

In some embodiments, the valve stem retainer device 100 may be implemented to retain valve stems from industrial linear operated valves in upstream, downstream, and utilities and petrochemical applications. In some embodiments, the valve stem retainer device 100 ensures safe repair operations of valves as several incidents may have occurred previously during repairing or replacing valves accessories connected to the valve stem. The valve stem retainer device 100 may include modifications and upgrades to ensure safe design and implementation during any valve repair activity. Material selection and tool design for manufacturing the valve stem retainer device 100 may be optimized to ensure the ease of local fabrication using typical machining tools.

Figure 2:
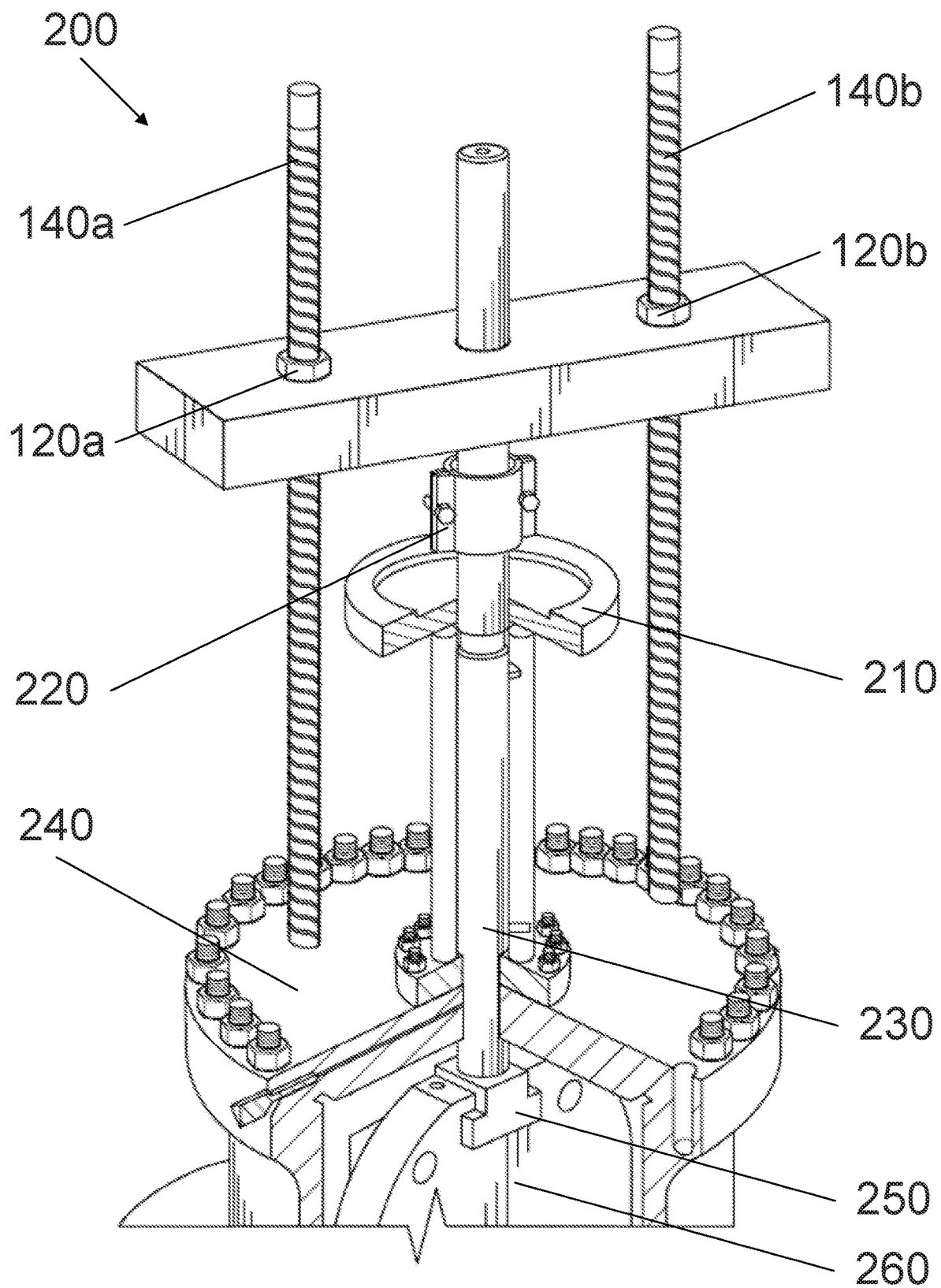
FIG. 2 shows a schematic diagram showing a valve stem retainer system in accordance with one or more embodiments.

FIG. 2 shows a schematic diagram illustrating a valve stem retainer system 200 including the valve stem retainer device 100 installed on a valve body 240. The valve stem retainer device 100, described in reference to FIG. 1, may be installed onto the valve stem 230 through the housing 110. In some embodiments, the valve stem retainer system 200 may include a steel clamp 220 that further prevents the valve stem 230 from falling through a stem adapter piece 210, which props the valve stem 230 vertically through the housing 110. The valve stem 230 is connected to a slab 260 through a connector 250. The slab 260 moves vertically to open or close the valve. The steel clamp 220 may be a heavy-duty and welding clamp that attaches to the valve stem 230 at a height located below the housing 110. The steel clamp 220 compresses the valve stem 230 and prevents the valve stem 230 from fitting into the valve body 240.

The valve in the valve stem retainer system 200 may be a valve that start/stop flow of fluid (i.e., hydrocarbons, oil & gas, steam, water, acids) through a pipeline. The valve may be a gate valve, a ball valve, a butterfly valve, a knife gate valve, or a plug valve. The valve may modulate the flow of the fluid through the pipeline or to control the flow of the fluid. In some embodiments, the valve may be used for changing a direction of the flow, for regulating a pressure of a process, for protecting a piping system or a piping device from overpressures or back-pressures. In some embodiments, the valve may filter debris flowing through the pipeline to protect equipment that may be damaged by solid parts.

In one or more embodiments, the valve stem retainer device 100 may restraint the valve stem 230 from moving in emergency situations, such as suddenly closing the valve during in-line repair. During the removal of valves actuator or top mounted gearbox, the valve closure element may be retrained from free falling using the valve stem retainer device 100. In this regard, falling may damage the valve internals or cause the valve to fully close and get jammed. In cases where the stem is not restrained from free movement during repair activities, a whole stem/gate connection may fall freely downwards.

In some embodiments, the valve stem retainer device 100 may include additional brackets or clamps to hold the valve stem 230 and the double set 120 of washer/nut to ensure tight and secure connection. The valve stem retainer device 100 may provide a second barrier of defense by clamping to prevent the valve stem 230 from moving even if the at least one bracket 130 and the steel rod 140 connection fails.

Figure 3:
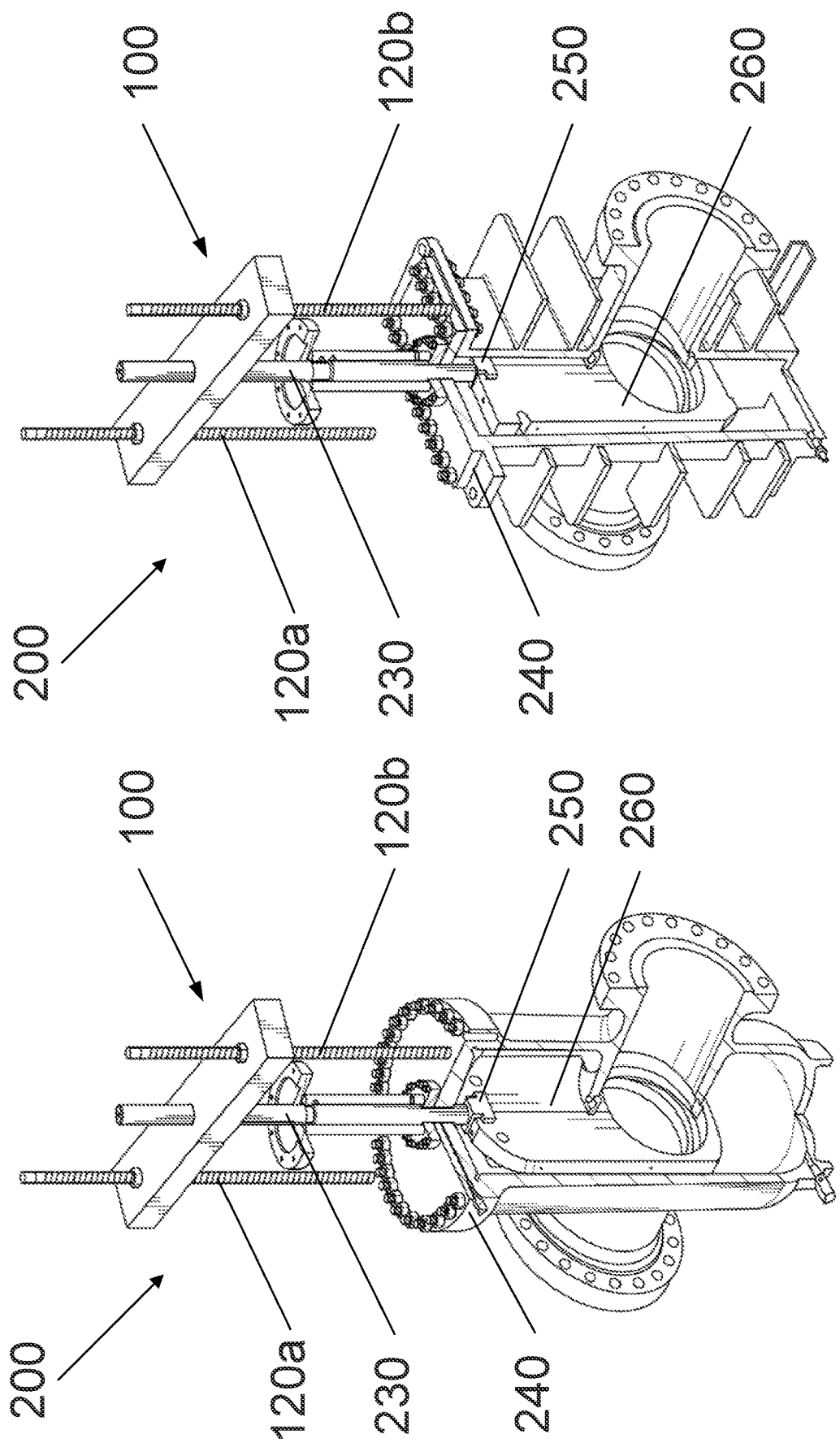
FIG. 3A shows a schematic diagram showing a valve stem retainer device in a valve stem retainer system of a first type in accordance with one or more embodiments.
FIG. 3B shows a schematic diagram showing a valve stem retainer device in a valve stem retainer system of a second type in accordance with one or more embodiments.

FIGS. 3A and 3B show schematic diagrams illustrating different types of valve systems. In particular, FIGS. 3A and 3B show the valve stem retainer device 100 installed onto a slab gate design with a cast round body and a slab gate design with fabricated style (e.g., modified to dissipate large amounts of heat), respectively. While these types of valves and valve systems are different, the valve stem retainer device 100 may be applied to prevent the valve stem 230 and the slab 320 from falling during repairs.

In some embodiments, the valve is a gate valve. This type of valve may be used in piping and pipeline applications. Gate valves are linear motion devices used open and close the flow of the fluid (i.e., shutoff valve). Gate valves cannot be used for throttling applications or to regulate the flow of the fluid. In this case, the valve system is either fully opened or fully closed.

In some embodiments, the valve is a global valve. This type of valve may be used to throttle, or regulate, the fluid flow. Globe valves may shut off the fluid flow by creating a pressure drop in the pipeline, as the fluid passes through a non-linear passageway. The check valve may be a check valve. This type of valve may be used to avoid backflow in a piping system or the pipeline.

Figure 4:
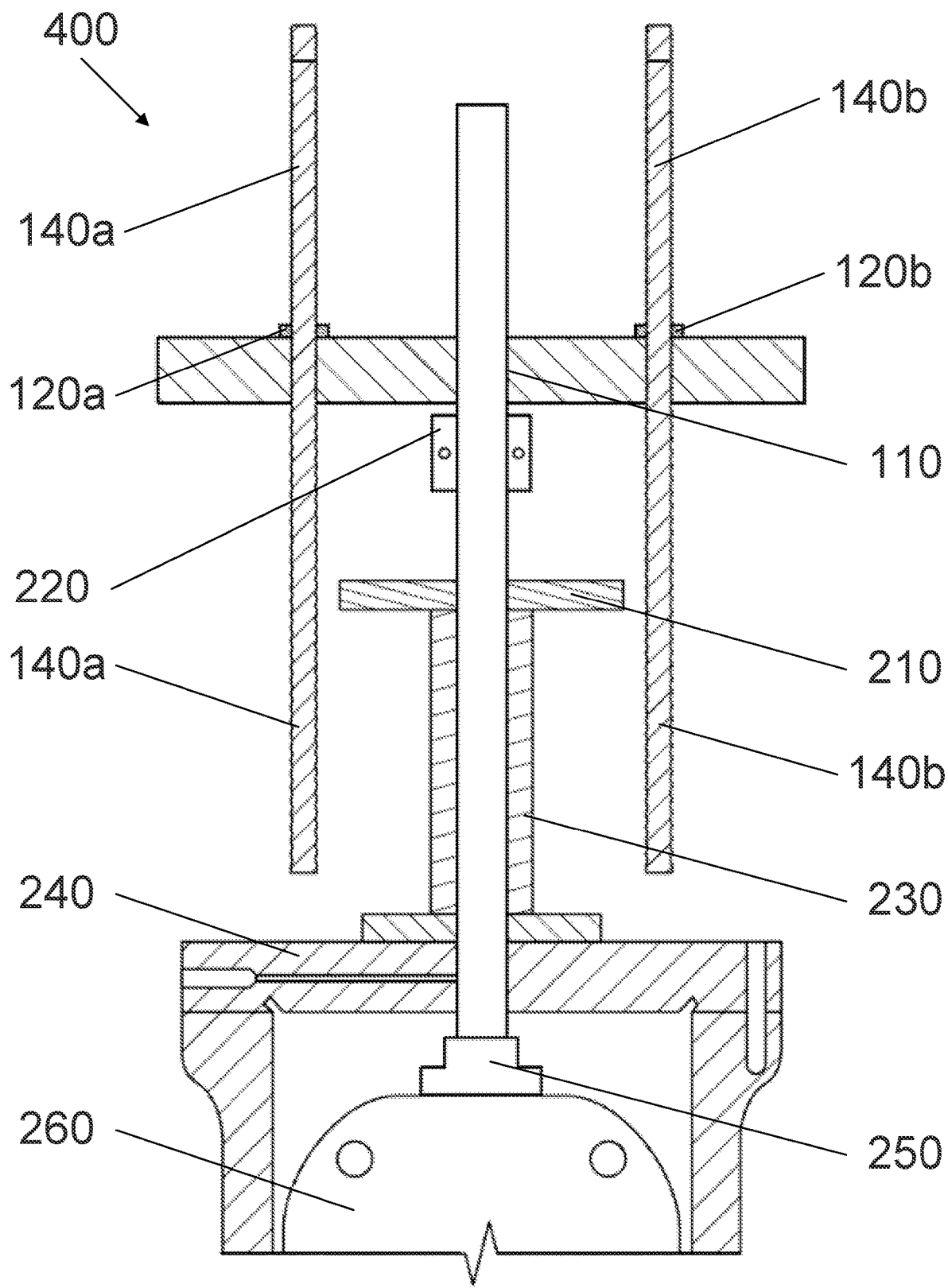
FIG. 4 shows a schematic diagram showing a cross-section view of a valve stem retainer system in accordance with one or more embodiments.

FIG. 4 shows a cross-section view 400 of the valve stem retainer system 200. The cross-section view 400 shows every element of the valve stem retainer device 100 keeping the valve stem 230 in place. In particular, the valve stem retainer device 100 retains the valve stem 230 that is connected to a gate 410 such that the gate 410 is prevented from falling and possibly jamming the valve body 240.

Figure 5:
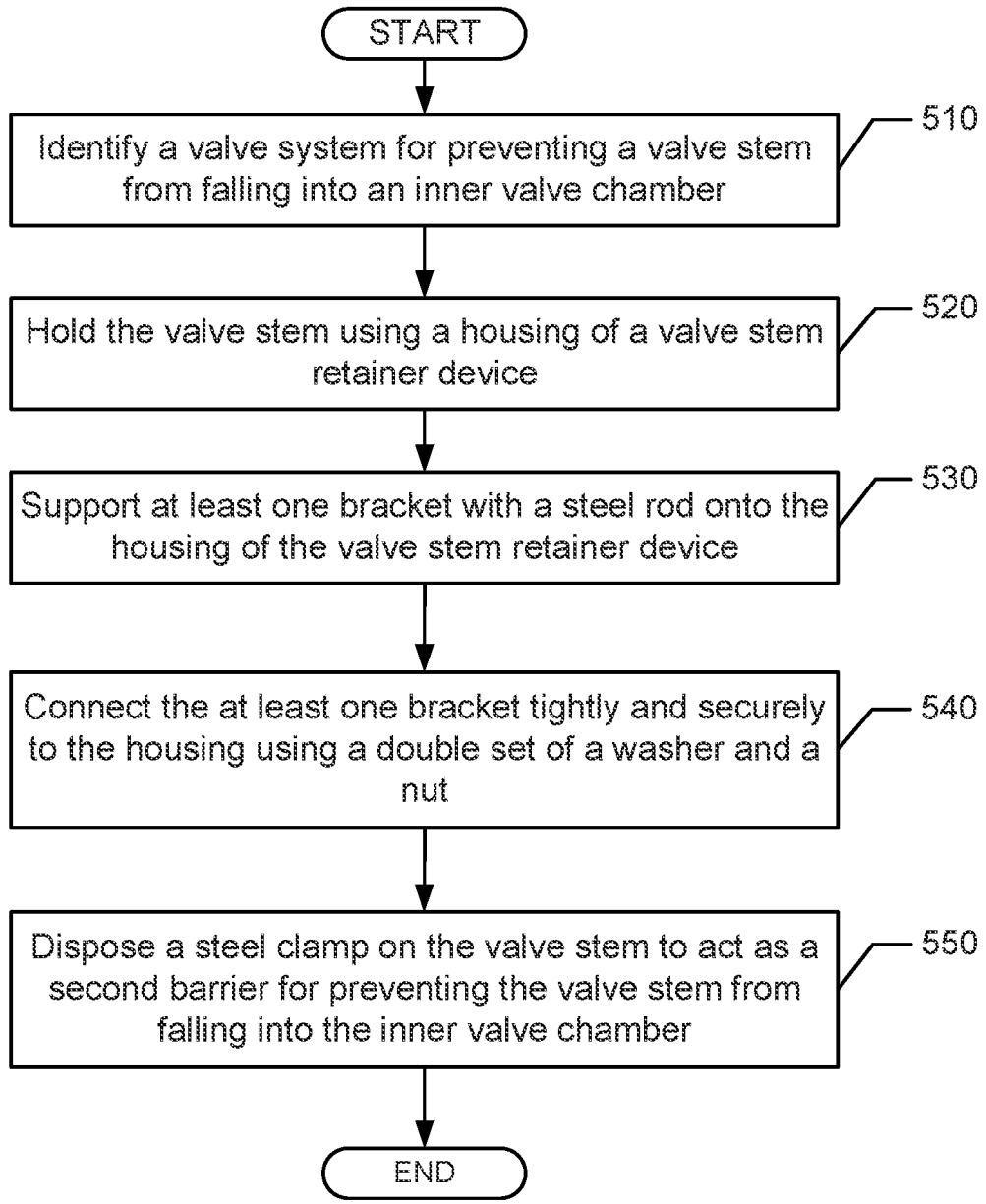
FIG. 5 shows a flowchart in accordance with one or more embodiments.

FIG. 5 shows a flowchart in accordance with one or more embodiments. Specifically, FIG. 5 describes a method for installing the valve stem retainer system 200. In some embodiments, the method may be implemented using the valve stem retainer device 100 described in reference to FIGS. 1-4. While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In one or more embodiments, the valve stem retainer device 100 may be incorporated in an upgraded valve stem retainer system 200 that includes valve stem retraining capabilities. Implementing the valve stem retainer device 100 may reduce implementing extensive amount of resources, man power, and equipment to remove whole stem connection for commencing repair activities. The valve stem retainer device 100 prevents unnecessary high cost because the valve stem retainer system 200 does not require completely dismantling of the valve to conduct repair jobs.

In some embodiments, the valve stem retainer device 100 may be modified to adjust the housing 110 to fit a range of valve sizes. The housing 110 may be modified to accommodate a change in weight of any related parts of the valve system. In particular, implementing the valve stem retainer device 100 provides secure restrain of the valve stem 230 preventing it from moving during repair activities. The valve stem retainer device 100 properly utilizes resources and prevent unnecessary costs in manufacturing of the valve stem retainer system 200.

In Block 510, a valve system type is identified for preventing a valve stem from falling into an inner valve chamber in the manner described in reference to FIGS. 1-4. In this regard, the valve system type is determined to be a valve system that allows for the valve stem retainer device 100 to retain the valve stem 230.

In Block 520, the valve stem is held in place using the housing 110 of the valve stem retainer device 100. At this point, the housing 110 is coupled to the valve stem 230 to prevent the valve stem 230 from closing without control.

In Block 530, the at least one bracket 130 is supported with the steel rod 140 onto the housing 110. The steel rod 140 prevents the bracket 130 and the housing 110 from moving along with the valve stem 230 in an event where the valve stem 230 may be released.

In Block 540, the at least one bracket is tightly and securely connected to the housing using the double set 120 of the washer and the nut.

In Block 550, the steel clamp 220 is disposed on the valve stem 230 to act as a second barrier. At this point, an additional barrier is placed for preventing the vale stem 230 from passing through the stem adapter piece 210 and into the inner chamber.

While FIGS. 1-5 show various configurations of components, other configurations may be used without departing from the scope of the disclosure. For example, various components in FIG. 1-4 may be combined to create a single component. As another example, the functionality performed by a single component may be performed by two or more components.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A valve stem retainer device, the device comprising:
a housing that holds a valve stem, the housing preventing the valve stem from closing without control;
at least one bracket that holds on to the housing;
a steel rod that holds on to the housing, the steel rod supporting the at least one bracket; and
a double set of a washer and a nut that ensures a tight and secure connection between the at least one bracket and the steel rod,
wherein the valve stem is configured to linearly actuate through the housing.

2. The device of claim 1, the device further comprising:
a steel clamp comprising a stem adapter that acts as a barrier.

3. The device of claim 1, wherein the valve stem is configured for fitting in a valve system of a first type or in a valve system of a second type.

4. The device of claim 3,
wherein the first type is different from the second type, and
wherein the first type is a slab gate type.

5. The device of claim 1, wherein the valve stem retainer device immediately stops the valve stem from falling into an inner valve chamber upon releasing of the valve stem.

6. A method for installing a valve stem retainer device, the method comprising:
identifying a valve system type for preventing a valve stem from falling into an inner valve chamber;
holding the valve stem in place using a housing of the valve stem retainer device, the housing preventing the valve stem from closing without control;
supporting at least one bracket with a steel rod holding onto the housing, the at least one bracket preventing the valve stem from falling into an inner chamber of the valve system;
connecting tightly and securely the at least one bracket to the steel rod using a double set of a washer and a nut; and
linearly actuating the valve stem through the housing.

7. A valve stem retainer system, the system comprising:
a valve stem that extends from an inner valve chamber to an outer valve chamber; and
a valve stem retainer device, the device comprising:
a housing that holds the valve stem, the housing preventing the valve stem from closing without control;
at least one bracket that holds on to the housing;
a steel rod that holds on to the housing, the steel rod supporting the at least one bracket; and
a double set of a washer and a nut that ensures a tight and secured connection between the at least one bracket and the steel rod,
wherein the valve stem is configured to linearly actuate through the housing.

8. The system of claim 7, wherein the device further comprises a steel clamp comprising a stem adapter that acts as a barrier.

9. The system of claim 7, wherein the valve stem is configured for fitting in a valve system of a first type or in a valve system of a second type.

10. The system of claim 9,
wherein the first type is different from the second type, and
wherein the first type is a slab gate type.

11. The system of claim 7, wherein the valve stem retainer device immediately stops the valve stem from falling into the inner valve chamber upon releasing of the valve stem.

12. The method of claim 6, the method further comprising:
disposing a steel clamp comprising a stem adapter on the valve stem to act as a second barrier.

13. The method of claim 6, wherein the valve stem is configured for fitting in a valve system of a first type or in a valve system of a second type.

14. The method of claim 13,
wherein the first type is different from the second type, and
wherein the first type is a slab gate type.

15. The method of claim 6, wherein the valve stem retainer device immediately stops the valve stem from falling into the inner valve chamber upon releasing of the valve stem.

* * * * *